United States Patent
Shin et al.

(10) Patent No.: US 8,805,203 B2
(45) Date of Patent: Aug. 12, 2014

(54) OPTICAL MODULATORS FOR GENERATING DE-EMPHASIS FORMATTED OPTICAL SIGNALS AND METHODS OF OPERATING THE SAME

(75) Inventors: Dong Jae Shin, Seoul (KR); Kwang Hyun Lee, Hwaseong-si (KR); Jung Hyung Pyo, Seoul (KR); Kyoung Ho Ha, Seoul (KR); Ho-Chul Ji, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 337 days.

(21) Appl. No.: 13/177,806

(22) Filed: Jul. 7, 2011

(65) Prior Publication Data

US 2012/0070151 A1  Mar. 22, 2012

Related U.S. Application Data

(60) Provisional application No. 61/383,873, filed on Sep. 17, 2010.

(30) Foreign Application Priority Data

Sep. 17, 2010  (KR) .................. 10-2010-0091586

(51) Int. Cl.
*H04B 10/12* (2006.01)
*H04J 14/00* (2006.01)

(52) U.S. Cl.
USPC ............. 398/182; 398/185; 398/183; 398/43; 398/102

(58) Field of Classification Search
USPC ............................ 398/98, 102, 202
See application file for complete search history.

(56) References Cited

U.S. PATENT DOCUMENTS

| 7,366,425 | B2 * | 4/2008 | Mamyshev et al. | ........... 398/188 |
| 7,558,486 | B2 | 7/2009 | Kang | |
| 7,720,392 | B2 * | 5/2010 | Nakashima et al. | .......... 398/198 |
| 2008/0304598 | A1 | 12/2008 | Yan et al. | |

FOREIGN PATENT DOCUMENTS

| JP | 2007-318483 | 12/2007 |
| JP | 2009-510921 | 3/2009 |

OTHER PUBLICATIONS

Gohel, Tushar, "The Practical Realities of High-Speed Digital Test in a Production Environment," 2012, IEEE, 6 pages.
"Emphasis (telecommunications)," en.wikipedia.org/wiki/Emphasis_(Telecommunications) #De-emphasis, printed from the Internet on Nov. 19, 2013, 3 pages.

* cited by examiner

*Primary Examiner* — Oommen Jacob
(74) *Attorney, Agent, or Firm* — Myers Bigel Sibley & Sajovec

(57) ABSTRACT

A de-emphasis format signal generator can be configured to combine first and second electrical non-de-emphasis formatted signals provided to first and second optical modulators, coupled in parallel with one another, to provide a combined optical signal having a de-emphasis format. Accordingly, three aspects of a de-emphasis formatted signal, including a de-emphasis delay aspect, a de-emphasis attenuation aspect, and a de-emphasis combining aspect, can provided separately and in different domains (such as in the electrical domain and in the optical domain) which can be combined with one another to provide an output de-emphasis formatted optical signal.

32 Claims, 15 Drawing Sheets

OPTICAL MODULATORS FOR GENERATING DE-EMPHASIS FORMATTED OPTICAL SIGNALS AND METHODS OF OPERATING THE SAME

CROSS-REFERENCE TO RELATED APPLICATIONS

The present Application claims priority to Korean Patent Application No. 10-2010-0091586, filed in the Korean Intellectual Property Office on Sep. 17, 2010, and to U.S. Provisional Patent Application No. 61/383,873, filed in the United States Patent and Trademark Office on Sep. 17, 2010, the disclosures of which are incorporated herein by reference in their entireties.

BACKGROUND

The present inventive concept relates to the field of semiconductors, and more particularly, to silicon based optical modulators.

De-emphasis formatting can be used for the serial transmission of data in the optical domain using an optical modulator. The structure of such an optical modulator, however, can be complicated and have relatively high power consumption.

SUMMARY

Embodiments according to the inventive concept can provide optical modulators for generating de-emphasis formatted optical signals. Pursuant to these embodiments, a de-emphasis format signal generator can be configured to combine first and second electrical non-de-emphasis formatted signals provided to first and second optical modulators, coupled in parallel with one another, to provide a combined optical signal having a de-emphasis format. Accordingly, three aspects of a de-emphasis formatted signal, including a de-emphasis delay aspect, a de-emphasis attenuation aspect, and a de-emphasis combining aspect, can provided separately and in different domains (such as in the electrical domain and in the optical domain) which can be combined with one another to provide an output de-emphasis formatted optical signal.

In some embodiments according to the inventive concept, a de-emphasis format signal generator can include at least one of an optical attenuator and an optical delay unit. An optical combiner is coupled to the at least one of the optical attenuator and the optical delay unit, to provide a de-emphasis formatted signal including a de-emphasis attenuation aspect, a de-emphasis delay aspect, and a de-emphasis combined aspect.

In some embodiments according to the inventive concept, a method of providing an optical signal can be provided by combining first and second non-de-emphasis formatted signals provided to first and second optical modulators, that are coupled in parallel with one another, to provide a combined optical signal having a de-emphasis format.

In some embodiments according to the inventive concept, a method of generating a de-emphasis formatted optical signal in an optical domain can be provided by generating a de-emphasis format for the optical signal including an de-emphasis attenuation aspect, a de-emphasis delay aspect, and a de-emphasis combined aspect, to the optical signal by providing at least one of the de-emphasis attenuation aspect and the de-emphasis delay aspect of the de-emphasis format in the optical domain

DETAILED DESCRIPTION

Figure 1:
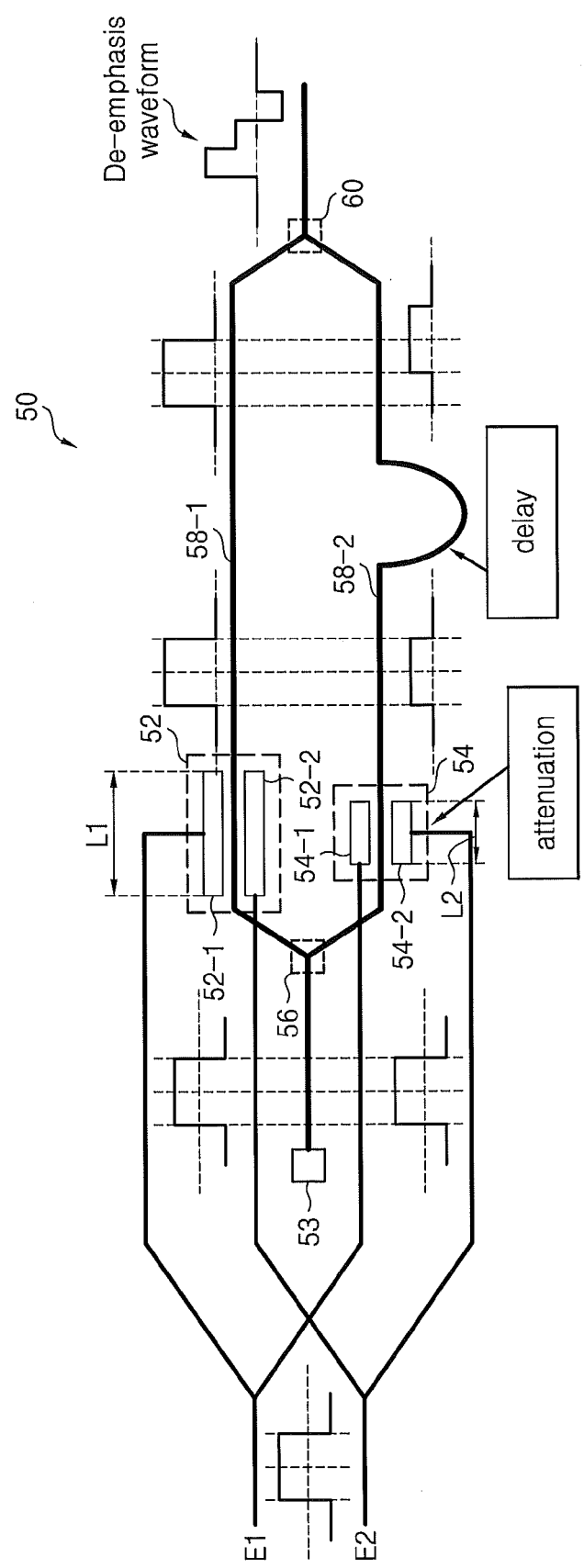
FIG. 1 is a schematic circuit diagram illustrating optical modulators in some embodiments according to the inventive concept.

The inventive concept is described more fully hereinafter with reference to the accompanying drawings, in which embodiments according to the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As described herein, in some embodiments according to the inventive concept, three aspects of a de-emphasis formatted signal, including a de-emphasis delay aspect, a de-emphasis attenuation aspect, and a de-emphasis combining aspect, can provided separately and in different domains (such as in the electrical domain and in the optical domain) which can be combined with one another to provide an output de-emphasis formatted optical signal.

FIG. 1 is a schematic circuit diagram illustrating an optical modulator 50 in some embodiments according to the inventive concept. The optical modulator 50 may comprise a Mach-Zehnder interferometer or a Mach-Zehnder modulator, or an equivalent structure to provide a de-emphasis format signal generator. The optical modulator 50 includes first and second optical modulators 52 and 54 coupled in parallel with one another, a second optical modulator 54, an optical splitter 56, and an optical combiner 60.

The first optical modulator 52, functioning as a phase shifter, modulates the phase of a first optical signal according to an input data stream and transmits a phase-modulated first optical signal to a first optical waveguide 58-1. The second optical modulator 54, functioning as a phase shifter, modulates the phase of a second optical signal according to the input data stream and transmits a phase-modulated second optical signal to a second optical waveguide 58-2.

The input data stream is generated based on a difference between a first electrical signal E1 provided to first electrodes 52-1 and 54-1 of the respective first and second optical modulators 52 and 54 and a second electrical signal E2 provided to second electrodes 52-2 and 54-2 of the respective first and second optical modulators 52 and 54. The first electrical signal E1 is split into two signals having the same amplitude. The second electrical signal E2 is also split into two signals each having the same amplitude. It will be understood that the electrical signals can be provided in a non-de-emphasis format.

The optical splitter 56 receives a continuous waveform optical signal from a light source 53, which power-splits the optical signal into the first and second optical signals. The first and second optical signals are transmitted to respective optical waveguides associated with the first and second optical modulators 52 and 54, respectively. The second optical modulator 54, that modulates the phase of the second optical signal, has a length L2 that is less than a length L1 of the first optical modulator 52, which modulates the phase of the first optical signal. The shorter the length of an optical modulator, the less phase modulation or phase shift that is provided to an optical signal used as the input. Accordingly, attenuation can occur when a phased shifted optical signal is combined with the other optical signal via the optical combiner 60.

It will be understood, that the shorter the length of an optical modulator, the less phase modulation or phase shift that is provided to an optical signal used as the input. Accordingly, attenuation of an optical signal can occur, when the phased shifted optical signal is combined with another optical signal via the optical combiner 60.

Figure 2:
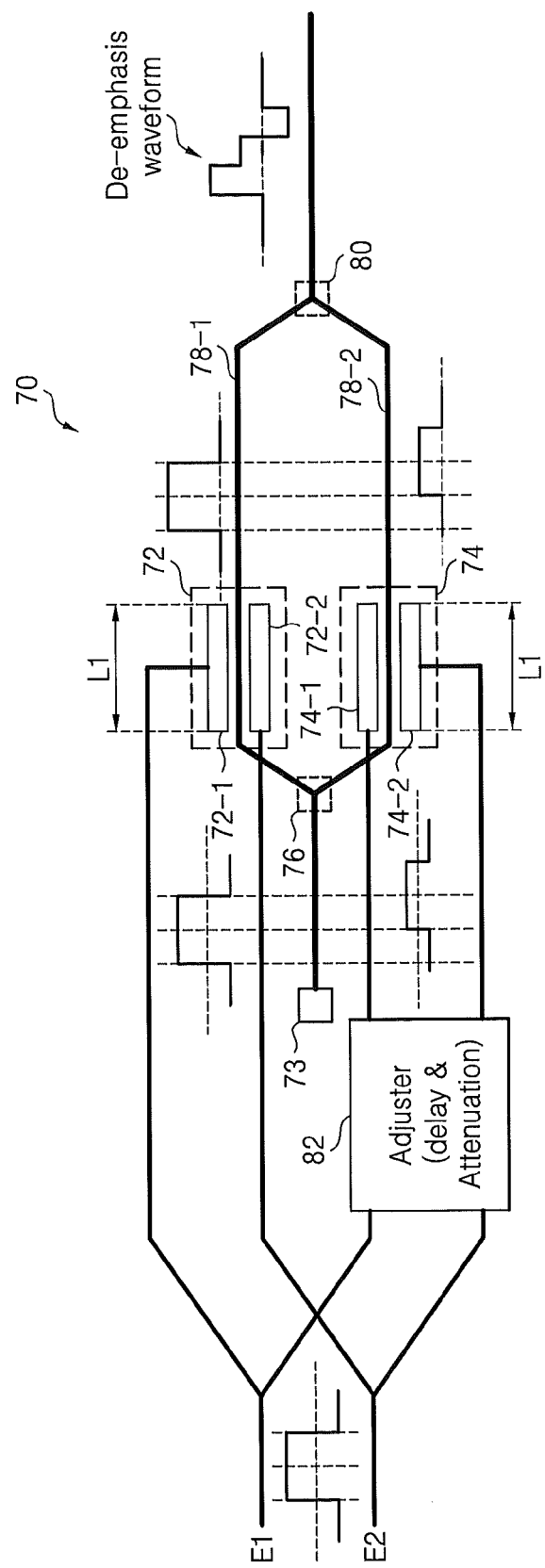
FIG. 2 is a schematic circuit diagram illustrating optical modulators in some embodiments according to the inventive concept.

A phase-modulated first optical signal is output from the first optical modulator 52 and is transmitted to the optical combiner 60 via the first optical waveguide 58-1. A phase-modulated second optical signal is Output from the second optical modulator 54 and is transmitted to the optical combiner 60 via the second optical waveguide 58-2. As shown in FIG. 2, the length of the first optical waveguide 58-1 (excluding the length of an optical waveguide included in the first optical modulator 52 itself) is shorter than the length of the second optical waveguide 58-2 (excluding the length of an optical waveguide in the second optical modulator 54). For instance, if the relative length of the first optical modulator 52 is 2 and the relative length of the first optical waveguide 58-1 is 8, the relative length of the second optical modulator 54 is 1 and the relative length of the second optical waveguide 58-2 is 9.

When the length of the second optical waveguide 58-2 is increased relative to the first optical waveguide 58-1, the phase-modulated second optical signal transmitted via the second optical waveguide 58-2 is delayed by a predetermined time (which can be expressed as a bit time interval) relative to the phase-modulated first optical signal transmitted via the first optical waveguide 58-1. As shown in FIG. 1, for example, the waveform representing E1 shows a data transition from low to high, which persists for two bit time intervals before transitioning back to the low level. The waveform also shows relative amplitudes for the signal E1.

The delay imparted to the phase-modulated second optical signal (relative to the phase-modulated first optical signal) can be expressed as 1 bit time interval, where the bit time interval is a time allotted to transmission of a single bit in a serial data transmission. Alternatively, when the first optical waveguide 58-1 and the second optical waveguide 58-2 have the same length, the optical modulator 50 may include a time delay unit or circuit (not shown) to impart the delay time to transmission of the phase-modulated second optical signal via the second optical waveguide 58-2.

The optical combiner 60 couples the phase-modulated first optical signal transmitted via the first optical waveguide 58-1 with the phase-modulated second optical signal delayed by the delay time via the second optical waveguide 58-2 to generate an output optical signal. Accordingly, each of the de-emphasis aspects of delay, attenuation, and combining can be provided in the optical domain to provide the de-emphasis formatted signal.

As described above, in some embodiments according to the inventive concept, the optical modulator 50 generates an output optical signal having a de-emphasis formatted signal using the second optical modulator 54 and the second optical waveguide 58-2 where the electrical signals are in a non-de-emphasis format.

FIG. 2 is a schematic circuit diagram of an optical modulator 70 in some embodiments according to the inventive concept. The optical modulator 70 may comprise a Mach-Zehnder interferometer, a Mach-Zehnder modulator, or an equivalent structure. The optical modulator 70 includes a first optical modulator 72, a second optical modulator 74, an optical splitter 76, and an optical combiner 80.

The first optical modulator 72, functioning as a phase shifter, modulates the phase of a first optical signal according to a first data stream and transmits a phase-modulated first optical signal to a first optical waveguide 78-1. The first data stream is generated based on a difference between a first electrical signal E1 provided to a first electrode 72-1 of the first optical modulator 72 and a second electrical signal E2 provided to a second electrode 72-2 of the first optical modulator 72.

The second optical modulator 74, functioning as a phase shifter, modulates the phase of a second optical signal according to a second data stream and transmits a phase-modulated second optical signal to a second optical waveguide 78-2. The second data stream is generated based on a difference between a third electrical signal provided to a first electrode 74-1 of the second optical modulator 74 and a fourth electrical signal provided to a second electrode 74-2 of the second optical modulator 74.

The optical modulator 70 also includes an adjuster 82, which adjusts the phase and the amplitude of the first data stream. In some embodiments according to the inventive concept, the adjuster 82 can include an electrical delay circuit (to adjust phase) and an attenuator circuit, that operate in the electrical signal domain to delay the data stream and to attenuate the amplitude of the data stream signal, respectively. The adjuster 82 delays the first data stream by a pre-determined time (which can be expressed as a bit time interval) and attenuates the amplitude (or power) of the first data stream. The adjuster 82 may simultaneously or sequentially perform the delay and the attenuation functions. The adjuster 82 may perform the delay before or after the attenuation.

The adjuster 82 adjusts the amplitude of and delays each of the first and second electrical signals E1 and E2 to generate the third and fourth electrical signals. The first electrical signal E1 is split into two signals (each having the same amplitude or power), where one of the split signals is input to the adjuster 82. The second electrical signal E2 is also split into two signals (each having the same amplitude or power), where one of the split signals is input to the adjuster 82.

The optical splitter 76 receives an optical input signal having a continuous waveform from a light source 73. The splitter 76 power-splits the optical input signal into the first and second optical signals, and transmits the two optical signals to the first and second optical modulators 72 and 74, respectively. The length L1 of the first optical modulator 72 is the same as the length L2 of the second optical modulator 74. The first and second optical modulators 72 and 74 modulate the respective input equally, but where the electrical input to the second optical modulator 74 has been delayed and attenuated relative to the input to the first optical modulator 72. The optical combiner 80 couples the phase-modulated first optical signal transmitted via the first optical waveguide 78-1 with the phase-modulated second optical signal transmitted via the second optical waveguide 78-2 to generate an output optical signal having a de-emphasis format.

Accordingly, the optical modulator 70 generates a modulated output optical signal having a de-emphasis formatted waveform using the adjuster 82 to attenuate the amplitude (or power) of and delay the first data stream in the electrical domain to provide the de-emphasis attenuation and delay aspects in the electrical domain and the optical combiner 80 to provide the de-emphasis combining aspect in the optical domain, all of which combine to provide the three aspects of the de-emphasis formatted signal in the optical domain.

Figure 3:
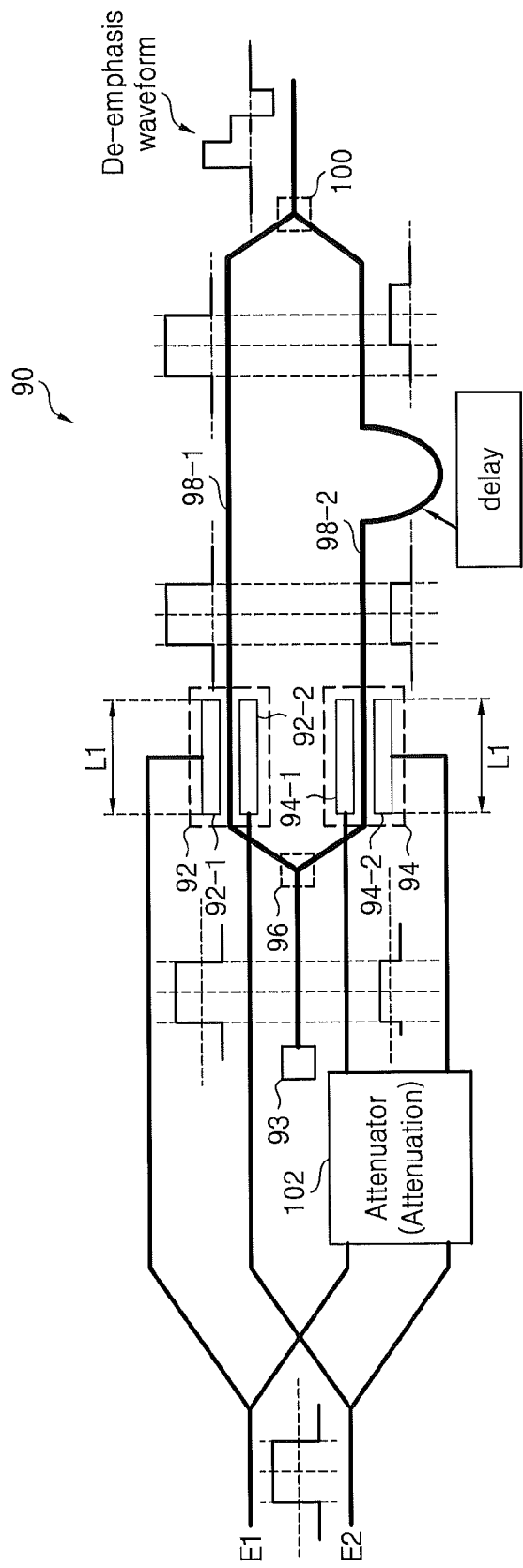
FIG. 3 is a schematic circuit diagram illustrating optical modulators in some embodiments according to the inventive concept.

FIG. 3 is a schematic circuit diagram of an optical modulator 90 in some embodiments according to the inventive concept. The optical modulator 90 may be implemented as a Mach-Zehnder interferometer, a Mach-Zehnder modulator, or equivalent structure. The optical modulator 90 includes a first optical modulator 92, a second optical modulator 94, an optical splitter 96, and an optical combiner 100.

The first optical modulator 92, functioning as a phase shifter, modulates the phase of a first optical signal according to a first data stream and transmits a phase-modulated first optical signal to a first optical waveguide 98-1. The first data stream is generated based on a difference between a first electrical signal E1 provided to a first electrode 92-1 of the first optical modulator 92 and a second electrical signal E2 provided to a second electrode 92-2 of the first optical modulator 92.

The second optical modulator 94, functioning as a phase shifter, modulates the phase of a second optical signal according to a second data stream and transmits a phase-modulated second optical signal to a second optical waveguide 98-2. The second data stream is generated based on a difference between a third electrical signal provided to a first electrode 94-1 of the second optical modulator 94 and a fourth electrical signal provided to a second electrode 94-2 of the second optical modulator 94.

The optical modulator 90 also includes an attenuator (i.e., electrical attenuator circuit) 102, which attenuates the amplitude (or power) of the first data stream. The attenuator 102 attenuates the amplitude of the first data stream to generate the second data stream. Accordingly, the attenuator 102 can provide the attenuation aspect of the de-emphasis format. For example, the attenuator 102 attenuates the amplitude of each of the first and second electrical signals E1 and E2 to generate the third and fourth electrical signals. The first electrical signal E1 is split into two signals, each having the same amplitude, where one of the split signals is input to the attenuator 102. The second electrical signal E2 is also split into two signals, each having the same amplitude, where one of the split signals is input to the attenuator 102.

The optical splitter 96 receives a continuous waveform optical input signal from a light source 93. The optical splitter 96 power-splits the optical input signal to provide the first and second optical signals, and transmits the first and second optical signals to the first and second optical modulators 92 and 94, respectively. A length L1 of the first optical modulator 92 equal to a length L2 of the second optical modulator 94.

The phase-modulated first optical signal output from the first optical modulator 92 is transmitted to the optical combiner 100 via the first optical waveguide 98-1 and the phase-modulated second optical signal output from the second optical modulator 94 is transmitted to the optical combiner 100 via the second optical waveguide 98-2.

As shown in FIG. 3, a length of the first optical waveguide 98-1 is less than a length of the second optical waveguide 98-2. When the length of the second optical waveguide 98-2 is adjusted, the phase-modulated second optical signal transmitted through the second optical waveguide 98-2 may be delayed by a predetermined amount relative to the phase-modulated first optical signal transmitted through the first optical waveguide 98-1. In some embodiments according to the inventive concept, the delay can be expressed as a bit time interval that indicates a time allotted to serial transmission of a data bit, such as 1 bit interval time. Alternatively, when the first optical waveguide 98-1 and the second optical waveguide 98-2 have the same length, the optical modulator 90 may include a bit delay unit (not shown) to delay the phase-modulated second optical signal transmitted via the second optical waveguide 98-2. Accordingly, the delay introduced to the signal transmitted via the second optical waveguide 98-2, can provide the de-emphasis delay aspect of the de-emphasis formatted optical signal in the optical domain.

The optical combiner 100 couples the phase-modulated first optical signal transmitted through the first optical waveguide 98-1 with the phase-modulated second optical signal delayed via the second optical waveguide 98-2 to generate a modulated output optical signal having a de-emphasis format.

In other words, the optical modulator 90 generates a modulated output optical signal having a de-emphasis formatted waveform using the attenuator 102 to attenuate the amplitude (or power) of the first data stream in the electrical domain to provide the de-emphasis attenuation aspect, the longer second optical waveguide 98-2 to provide the de-emphasis delay aspect in the optical domain, and the optical combiner 100 to provide the de-emphasis combining aspect in the optical domain, all of which combine to provide the three aspects of the de-emphasis formatted signal in the optical domain.

Figure 4:
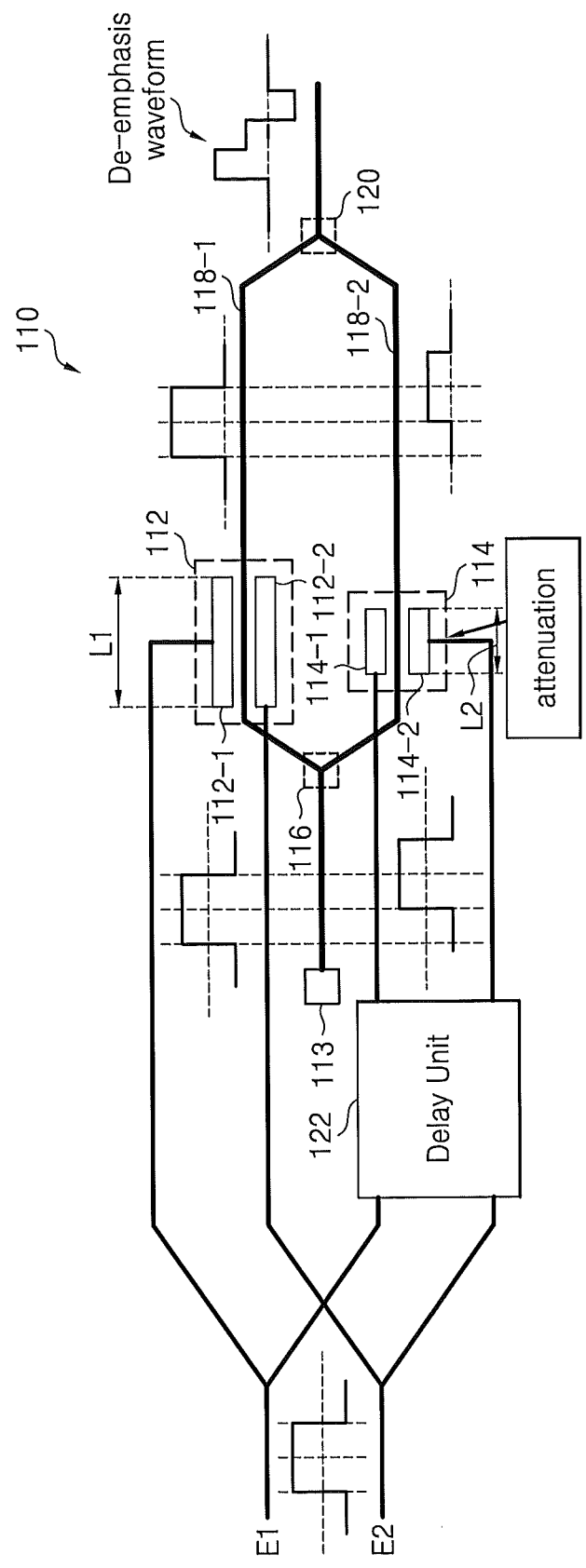
FIG. 4 is a schematic circuit diagram illustrating optical modulators in some embodiments according to the inventive concept.

FIG. 4 is a schematic circuit diagram of an optical modulator 110 in some embodiments according to the inventive concept. The optical modulator 110 may be implemented as a Mach-Zehnder interferometer, a Mach-Zehnder modulator, or equivalent structure. The optical modulator 110 includes a first optical modulator 112, a second optical modulator 114, an optical splitter 116, and an optical combiner 120.

The first optical modulator 112, functioning as a phase shifter, modulates the phase of a first optical signal according to a first data stream and transmits a phase-modulated first optical signal to a first optical waveguide 118-1. The first data stream is generated based on a difference between a first electrical signal E1 provided to a first electrode 112-1 of the first optical modulator 112 and a second electrical signal E2 provided to a second electrode 112-2 of the first optical modulator 112.

The second optical modulator 114, functioning as a phase shifter, modulates the phase of a second optical signal according to a second data stream and transmits a phase-modulated second optical signal to a second optical waveguide 118-2. The second data stream is generated based on a difference between a third electrical signal provided to a first electrode 114-1 of the second optical modulator 114 and a fourth electrical signal provided to a second electrode 114-2 of the second optical modulator 114.

The optical modulator 110 includes a delay unit (i.e., electrical delay circuit) 122, which delays the first data stream by a bit time interval. The first electrical signal E1 is split into two signals, each having the same amplitude, where one of the split signals is provided to the delay unit 122. The second electrical signal E2 is also split into two signals, each having the same amplitude, where one of the split signals is provided to the delay unit 122. The delay unit 122 delays the first data stream by the bit time interval to generate the second data stream. For example, the delay unit 122 delays each of the first and second electrical signals E1 and E2 by the bit time interval to provide the third and fourth electrical signals. Accordingly, the de-emphasis delay aspect can be provided in the electrical domain by the delay unit 122.

The optical splitter 116 receives an optical input signal from a continuous waveform light source 113, which power-splits the optical input signal into the first and second optical signals, and transmits the two optical signals to the first and second optical modulators 112 and 114, respectively. A length L2 of the second optical modulator 114, modulating the second optical signal, is less than a length L1 of the first optical modulator 112 modulating the first optical signal. The shorter the length of an optical modulator, the less phase modulation or phase shift that is provided to an optical signal used as the input. Accordingly, attenuation of an optical signal can occur, when the phased shifted optical signal is combined with another optical signal via the optical combiner 120.

The phase-modulated first optical signal, output from the first optical modulator 112, is transmitted to the optical combiner 120 via the first optical waveguide 118-1. The phase-modulated second optical signal, output from the second optical modulator 114, is transmitted to the optical combiner 120 via the second optical waveguide 118-2. The length of the first optical waveguide 118-1 (excluding the length of an optical waveguide included in the first optical modulator 112 itself) is equal to the length of the second optical waveguide 118-2 (excluding the length of an optical waveguide in the second optical modulator 114)

The optical combiner 120 couples the phase-modulated first optical signal transmitted via the first optical waveguide 118-1 with the phase-modulated second optical signal transmitted via the second optical waveguide 118-2 to generate a modulated output optical signal having a de-emphasis format. Accordingly, the optical combiner 120 can provide the de-emphasis combining aspect of the de-emphasis formatted optical signal in the optical domain.

Accordingly, the optical modulator 110 generates a modulated output optical signal having a de-emphasis format using the delay unit 122 to provide the de-emphasis delay aspect in the electrical domain, the shorter length second optical modulator 114 to provide the de-emphasis attenuation aspect in the optical domain, and the optical combiner 120 to provide the de-emphasis combining aspect in the optical domain, all of which combine to provide the three aspects of the de-emphasis formatted signal in the optical domain.

Figure 5:
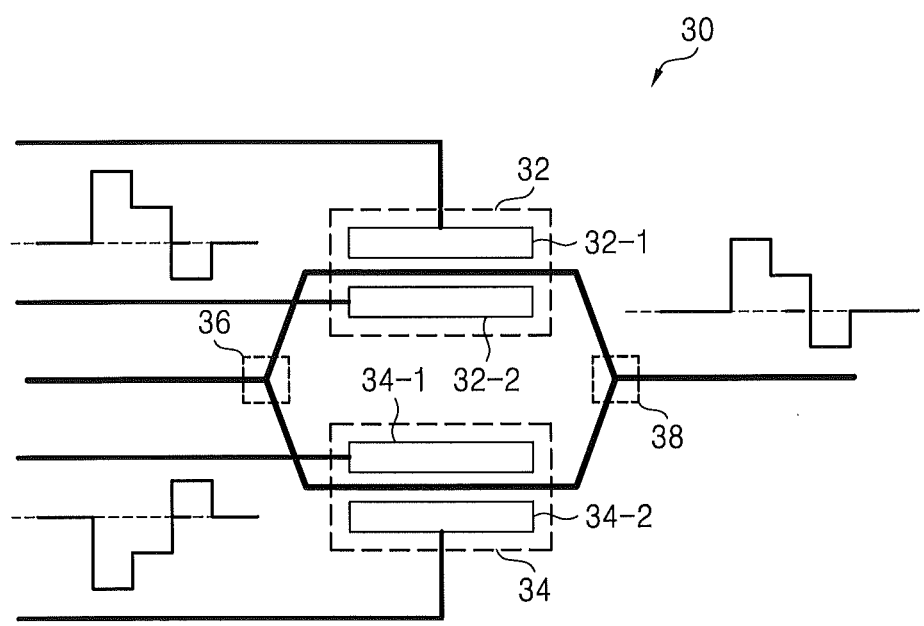
FIG. 5 is a schematic circuit diagram illustrating optical modulators in some embodiments according to the inventive concept.

FIG. 5 is a schematic circuit diagram of an optical modulator 30 in some embodiments according to the inventive concept. Referring to FIG. 5, the optical modulator 30 includes a first optical modulator 32, a second optical modulator 34, an optical splitter 36, and an optical combiner 38. The first optical signal output from the optical splitter 36 is provided to the first optical modulator 32 and the second optical signal output from the optical splitter 36 is provided to the second optical modulator 34.

The first de-emphasis signal is provided to two electrodes 32-1 and 32-2 of the first optical modulator 32 and the second de-emphasis signal is provided to two electrodes 34-1 and 34-2 of the second optical modulator 34. The first and second de-emphasis signals are temporally synchronized and have opposite phases.

The optical combiner 38 couples the phase-modulated first optical signal output from the first optical modulator 32 with the phase-modulated second optical signal output from the second optical modulator 34 to generate an optical output signal having a de-emphasis format.

Figure 6:
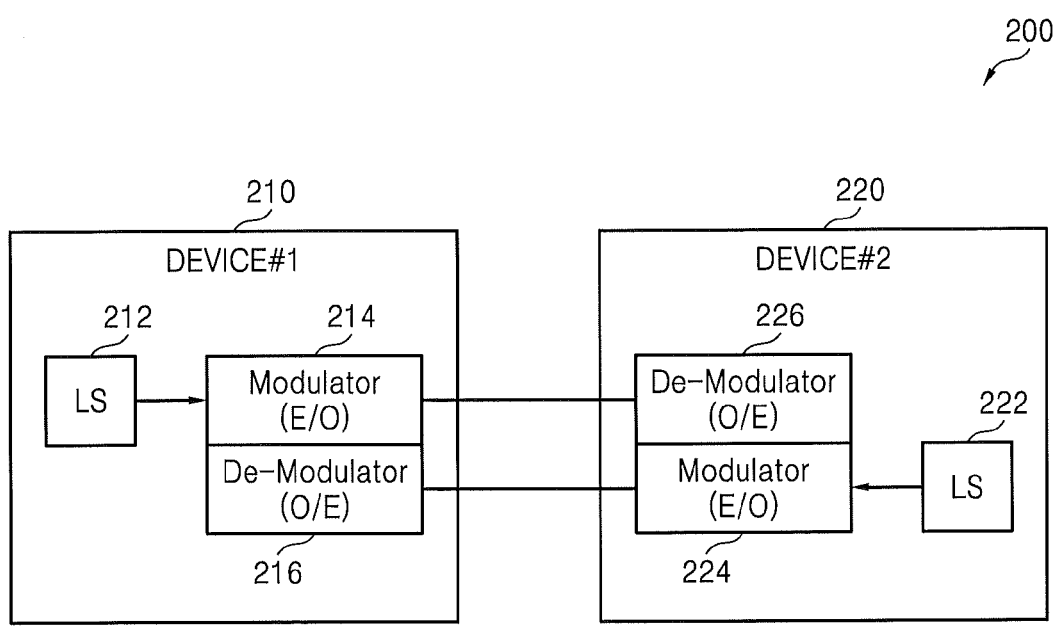
FIG. 6 is a block diagram illustrating a data processing system including optical modulators illustrated in FIGS. 1 through 5 in some embodiments according to the inventive concept.

FIG. 6 is a block diagram illustrating a data processing system 200 including optical modulators illustrated in FIGS. 1 through 5, in some embodiments according to inventive concept. Referring to FIG. 6, the data processing system 200 includes a first device 210 and a second device 220. The first device 210 and the second device 220 transmit and receive de-emphasis formatted optical signals via serial communication.

The first device 210 includes a first light source 212 (such as a laser), a first optical modulator 214 performing electrical-to-optical (E/O) conversion of signals transmitted by the first device 210, and a first optical demodulator 216 performing optical-to-electrical (O/E) conversion of signals received by the first device 210.

The first light source 212 outputs an optical signal with a continuous waveform. The first light source 212 may be implemented by one of the light sources 53, 73, 93, and 113 respectively illustrated in FIGS. 1 through 5. The first optical modulator 214 may be implemented by one of the optical modulators 50, 70, 90, 110, and 30 respectively illustrated in FIGS. 1 through 5. The first optical demodulator 216 receives a de-emphasis formatted optical signal over an interconnect coupled to the second device 220, demodulates the received de-emphasis formatted optical signal, and outputs a demodulated electrical signal.

The second device 220 includes a second light source 222, a second optical modulator 224, and a second optical demodulator 226. The second light source 222 outputs an optical signal with a continuous waveform. The second light source 222 may be implemented by one of the light sources 53, 73, 93, and 113 respectively illustrated in FIGS. 1 through 5. The second optical modulator 224 may be implemented by one of the optical modulators 50, 70, 90, 110, and 30 respectively illustrated in FIGS. 1 through 5. The second optical demodulator 226 receives a de-emphasis formatted optical signal over the interconnect from the first optical modulator 214 in the first device 210, demodulates the de-emphasis formatted optical signal, and outputs a demodulated electrical signal for use by the second device 220.

Figure 7:
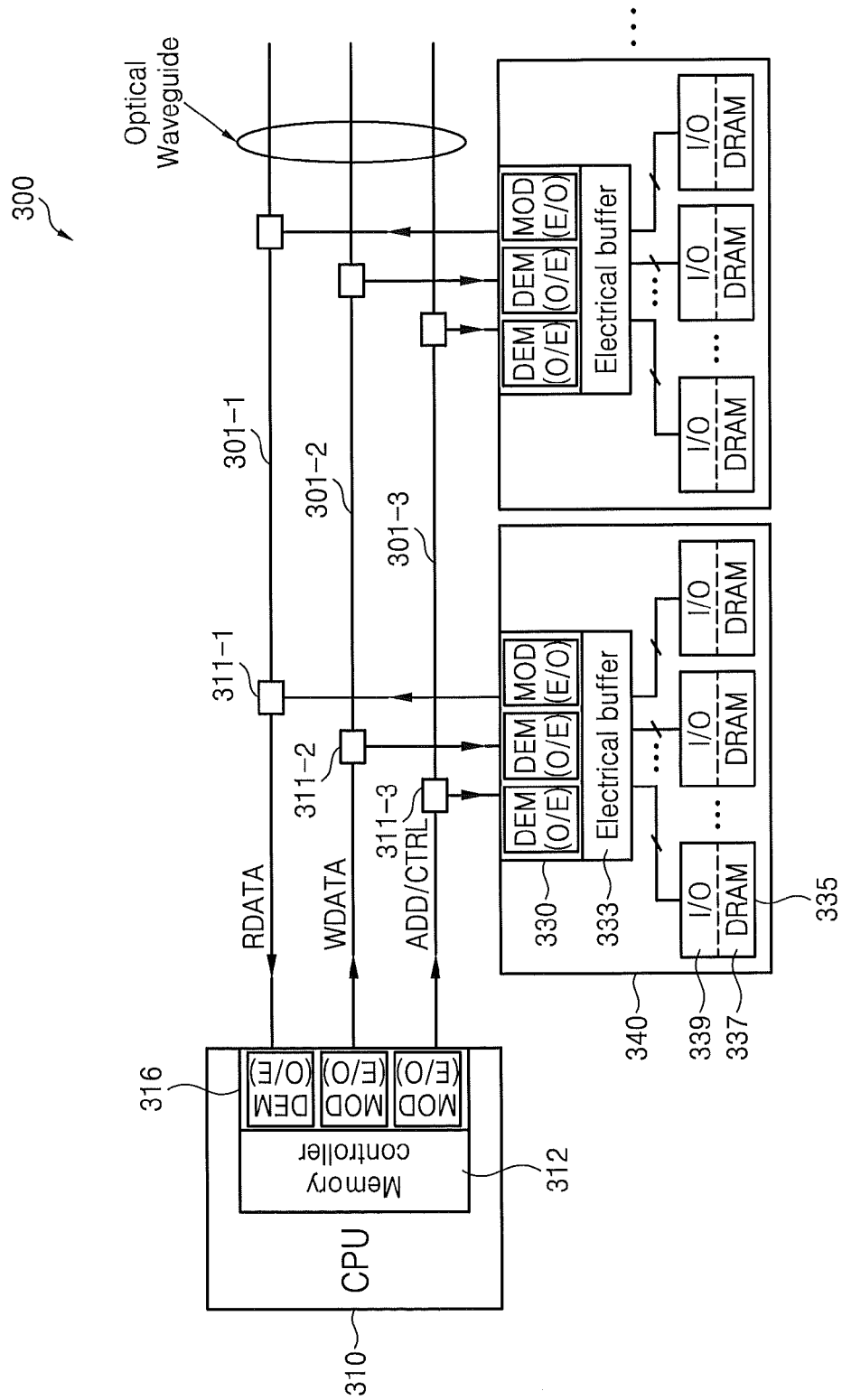
FIG. 7 is a block diagram illustrating a data processing system including optical modulators illustrated in FIGS. 1 through 5 in some embodiments according to the inventive concept.

FIG. 7 is a block diagram illustrating a data processing system 300 including optical modulators illustrated in FIGS. 1 through 5 in some embodiments according to the inventive concept. In FIG. 7, MOD(E/O) denotes an optical modulator used as an E/O converter. The optical modulator MOD(E/O) may be implemented by one of the optical modulators 50, 70, 90, 110, and 30 respectively illustrated in FIGS. 1 through 5. The data processing system 300 includes a central processing unit (CPU) 310, a plurality of data buses 301-1, 301-2, and 301-3, and a plurality of memory modules 340 connected to the CPU 310 via the plurality of data buses 301-1, 301-2, and 301-3.

The memory modules 340 transmit and receive de-emphasis formatted optical signals via a plurality of couplers 311-1, 311-2, and 311-3 respectively connected to the data buses 301-1 through 301-3. Each of the couplers 311-1 through 311-3 may be implemented by an electrical coupler or an optical combiner.

The CPU 310 includes a first optical transceiver 316, which includes at least one optical modulator MOD(E/O) and at least one optical demodulator DEM(O/E), and a memory controller 312. The optical demodulator DEM(O/E) is used as an O/E converter. The memory controller 312 is controlled by the CPU 310 to control the operations, e.g., the transmitting operation and the receiving operation, of the first optical transceiver 316.

During a write operation, a first optical modulator MOD(E/O) of the first optical transceiver 316 generates a modulated de-emphasis formatted optical signal ADD/CTRL from electrical addresses and control signals, as described above with reference to FIGS. 1 through 5, and transmits the de-emphasis formatted optical signal ADD/CTRL over the data bus 301-3 under control of the memory controller 312. After the first optical transceiver 316 transmits the de-emphasis formatted optical signal ADD/CTRL over the data bus 301-3, a second optical modulator MOD(E/O) of the first optical transceiver 316 generates modulated de-emphasis formatted optical write data WDATA and transmits the de-emphasis formatted optical write data WDATA over the data bus 301-2.

Each of the memory modules 340 includes a second optical transceiver 330 and a plurality of memory devices 335. Each memory module 340 may be implemented by an optical dual in-line memory module (DIMM), an optical fully buffered DIMM, an optical small outline dual in-line memory module (SO-DIMM), an optical registered DIMM (RDIMM), an optical load reduced DIMM (LRDIMM), an optical unbuffered DIMM (UDIMM), an optical micro DIMM, or an optical single in-line memory module (SIMM).

Referring to FIG. 7, an optical demodulator DEM(O/E) in the second optical transceiver 330 demodulates the de-emphasis formatted optical write data WDATA received via the data bus 301-2 and transmits a demodulated electrical signal to at least one of the memory devices 335.

Each memory module 340 may also include an electrical buffer 333 which buffers electrical signals output from the optical demodulator DEM(O/E). For instance, the electrical buffer 333 may buffer a demodulated electrical signal and transmit the buffered electrical signal to at least one of the memory devices 335. Each of the memory devices 335 includes a memory array 337 including a plurality of memory cells, an access circuit (I/O) 339 accessing the memory array 337, and control logic (not shown) controlling the operation of the access circuit 339.

During a read operation, an electrical signal output from a memory device 335 is modulated, by an optical modulator MOD(E/O) included in the second optical transceiver 330, to provide de-emphasis formatted optical read data RDATA. The de-emphasis formatted optical read data RDATA is transmitted over the data bus 301-1 to a first optical demodulator DEM(O/E) included in the CPU 310. The first optical demodulator DEM(O/E) demodulates the de-emphasis formatted optical read data RDATA and transmits a demodulated electrical signal to the memory controller 312.

Figure 8:
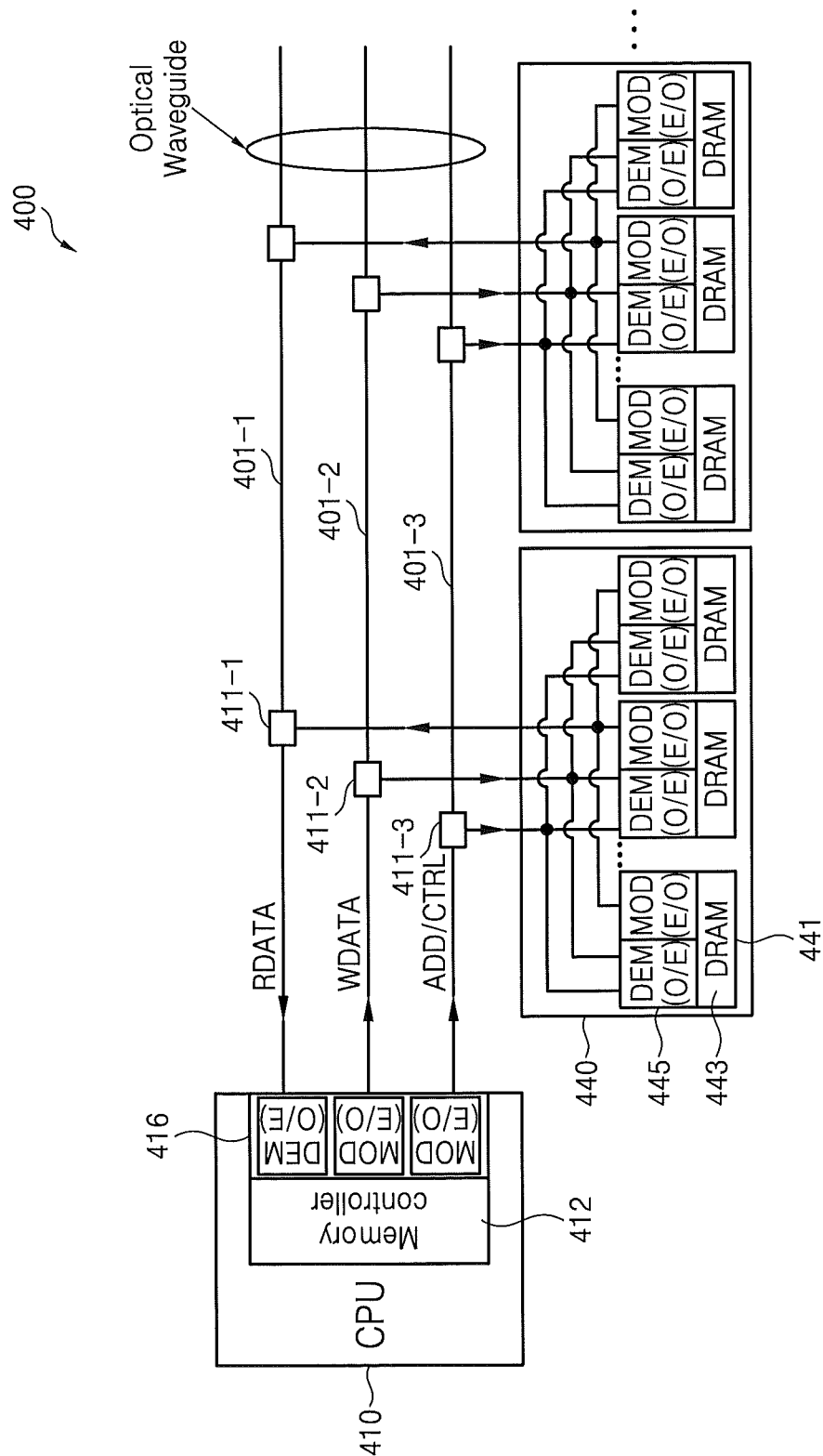
FIG. 8 is a block diagram illustrating a data processing system including optical modulators illustrated in FIGS. 1 through 5 in some embodiments according to the inventive concept.

FIG. 8 is a block diagram illustrating a data processing system 400 including one of the optical modulators illustrated in FIGS. 1 through 5 in some embodiments according to the inventive concept. In FIG. 8, MOD(E/O) denotes an optical modulator performing E/O conversion. The optical modulator MOD(E/O) may be implemented by one of the optical modulators 50, 70, 90, 110, and 30 respectively illustrated in FIGS. 1 through 5. Referring to FIG. 8, the data processing system 400 includes a CPU 410, a plurality of data buses 401-1, 401-2, and 401-3, and a plurality of memory modules 440. The data buses 401-1 through 401-3 transmit signals electrically or optically.

Each of the memory modules 440 includes a plurality of memory devices 441. Each of the memory devices 441 includes a second optical transceiver 445. Each memory device 441 also includes a memory array 443 including a plurality of memory cells, an access circuit (not shown) accessing the memory array 443, and control logic (not shown) controlling the operation of the access circuit.

Address and control signals ADD/CTRL for a write operation are transmitted to at least one of the memory devices 441 via the data bus 401-3. The optical modulator MOD(E/O) included in a first optical transceiver 416 in the CPU 410 transmits de-emphasis formatted optical write data WDATA to an optical demodulator DEM(O/E) included in a second optical transceiver 445 in a first memory module 440 via an optical combiner 411-2 connected to the data bus 401-2 under control of the memory controller 412. The optical demodulator DEM(O/E) of the second optical transceiver 445 demodulates the de-emphasis formatted optical write data WDATA to generate a demodulated electrical signal. The access circuit writes the electrical signal to the memory array 443 using the control logic.

During a read operation, addresses and control signals ADD/CTRL for the read operation are transmitted to at least one of the memory devices 441 via the data bus 401-3. The optical modulator MOD(E/O) in the second optical transceiver 445 modulates an electrical signal output from the memory array 443 to provide de-emphasis formatted optical read data RDATA, which is transmitted to an optical demodulator DEM(O/E) in the first optical transceiver 416 of the CPU 410 via an optical combiner 411-1 connected to the data bus 401-1. The optical demodulator DEM(O/E) of the first optical transceiver 416 demodulates the de-emphasis formatted optical read data RDATA to provide an electrical signal to the memory controller 412.

Figure 9:
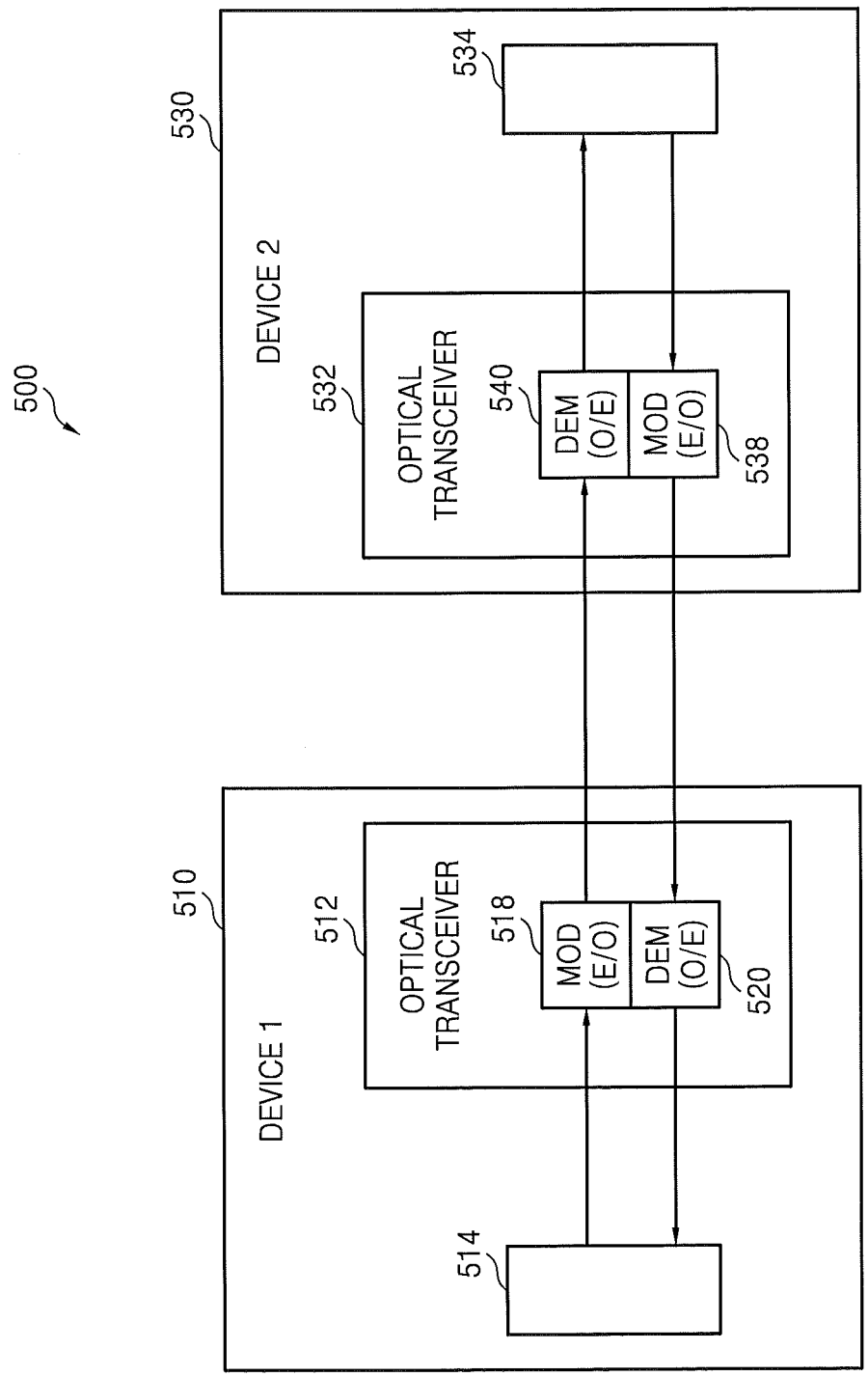
FIG. 9 is a block diagram illustrating a data processing system including optical modulators illustrated in FIGS. 1 through 5 in some embodiments according to the inventive concept.

FIG. 9 is a block diagram illustrating a data processing system 500 including optical modulators illustrated in FIGS. 1 through 5, in some embodiments according to inventive concept. Referring to FIG. 9, the data processing system 500 includes a first device 510 and a second device 530. In FIG. 9, MOD(E/O) denotes an optical modulator that may be implemented by one of the optical modulators 50, 70, 90, 110, and 30 respectively illustrated in FIGS. 1 through 5.

The first device 510 and the second device 530 transmit and receive data using a serial communication protocol, that supports a universal asynchronous receiver-transmitter (UART), serial peripheral interface (SPI), an inter-integrated circuit (I2C), a system management bus (SMBus), a controller area network (CAN), a universal serial bus (USB), an inter-chip (IC)-USB, camera serial interface defined by the mobile industry processor interface (MIPI®), display serial interface (DSI) defined by the MIPI®, mobile display digital interface (MDDI), a local interconnect network (LIN), PCI-Express, or any other serial communications protocol that supports de-emphasis formatted data transmission.

The first optical modulator 518 in a first optical transceiver 512 in the first device 510, transmits a modulated de-emphasis formatted optical signal via a data bus to a second optical demodulator 540 included in a second optical transceiver 532 included in the second device 530 under control of a first microprocessor 514 included in the first device 510. The second optical demodulator 540 demodulates the de-emphasis formatted optical signal to provide an electrical signal. A second microprocessor 534 included in the second device 530 processes the electrical signal output from the second optical demodulator 540. For instance, the second microprocessor 534 may write the electrical signal to a memory array during a write operation.

The second optical modulator 538 included in the second optical transceiver 532 of the second device 530 transmits a modulated de-emphasis formatted optical signal via a data bus to a first optical demodulator 520 in the first optical transceiver 512 of the first device 510 under control of the second microprocessor 534. The first optical demodulator 520 demodulates the de-emphasis formatted optical signal to provide an electrical signal. The first microprocessor 514 processes the electrical signal from the first optical demodulator 520. For instance, the first microprocessor 514 may process the electrical signal as read data during a read operation. It will be understood that the microprocessors 514 and 534 are processor circuits that control the operations of the devices 510 and 530, respectively, during, for example, write and read operations.

Figure 10:
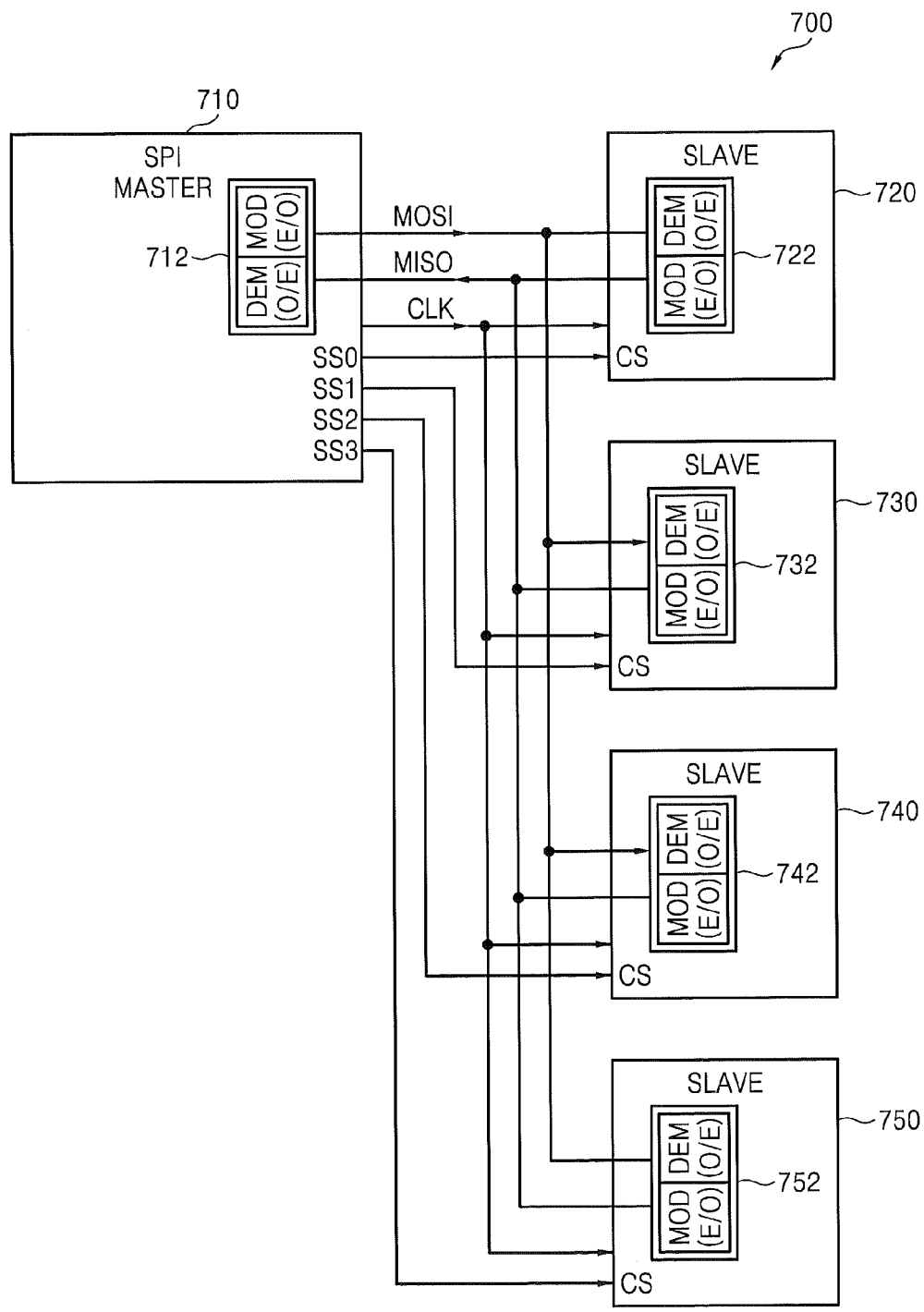
FIG. 10 is a block diagram illustrating a data processing system including optical modulators illustrated in FIGS. 1 through 5 in some embodiments according to the inventive concept.

FIG. 10 is a block diagram illustrating a data processing system 700 including one of the optical modulators illustrated in FIGS. 1 through 5 in some embodiments according to inventive concept. The data processing system 700 transmits and receives serial data using a SPI communication protocol and includes a SPI master 710 and one or more SPI slaves 720, 730, 740, and 750. In FIG. 10, MOD(E/O) denotes an optical modulator that may be implemented by one of the optical modulators 50, 70, 90, 110, and 30 respectively illustrated in FIGS. 1 through 5. The SPI slaves 720, 730, 740, and 750 may be a shift register, a memory chip, a port expander, a display driver, a data converter, a printer, a data storage, a sensor, or a microprocessor.

The first optical transceiver 712 included in the SPI master 710 transmits or receives a de-emphasis formatted optical signal (i.e., a master-out slave-in (MOSI) signal or a master-in slave-out (MISO) signal) to or from each of second optical transceivers 722, 732, 742, and 752, respectively included in the SPI slaves 720, 730, 740, and 750 via an optical data bus. The SPI master 710 includes a microprocessor (not shown) configured to control the operation of the first optical transceiver 712. Each of the SPI slaves 720, 730, 740, and 750 can include a microprocessor (not shown) configured to control the operation of the second optical transceiver 722, 732, 742, or 752.

The first optical transceiver 712 transmits a serial clock signal CLK to the second optical transceivers 722, 732, 742, and 752 via an electrical or optical data bus. The SPI slaves 720, 730, 740, and 750 may be selected by chip selection signals SS0, SS1, SS2, and SS3, respectively. The chip selection signals SS0, SS1, SS2, and SS3 may be transmitted to the second optical transceivers 722, 732, 742, and 752, respectively, via electrical or optical data buses, respectively.

Figure 11:
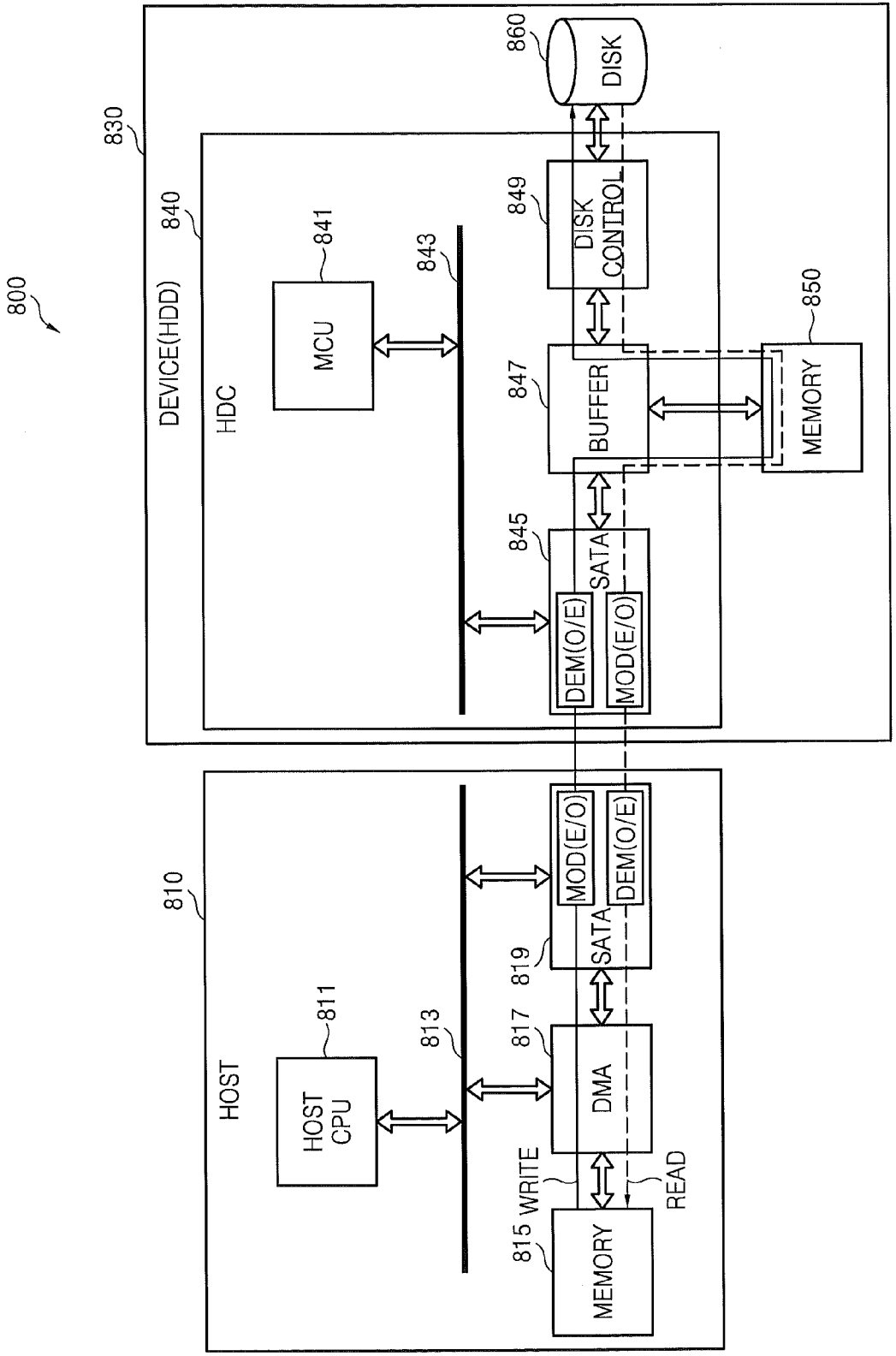
FIG. 11 is a block diagram illustrating a data processing system including optical modulators illustrated in FIGS. 1 through 5 in some embodiments according to the inventive concept.

FIG. 11 is a block diagram illustrating a data processing system 800 including optical modulators illustrated in FIGS. 1 through 5 in some embodiments according to the inventive concept. The data processing system 800 transmits and receives serial data using a serial advanced technology attachment (SATA) communication protocol and includes a SATA host 810 and a SATA device 830. In FIG. 11, MOD(E/O) denotes an optical modulator that may be implemented by one of the optical modulators 50, 70, 90, 110, and 30 respectively illustrated in FIGS. 1 through 5.

The SATA host 810 includes a host CPU 811, a data bus 813, a memory 815, a direct memory access (DMA) controller 817, and a first STAT interface 819. The host CPU 811 controls the operation of the DMA controller 817 or the first SATA interface 819. The first SATA interface 819 includes a first optical modulator MOD(E/O) and a first optical demodulator DEM(O/E). The SATA host 810 may also include a controller controlling the operation of the first SATA interface 819. The controller may be implemented within the first SATA interface 819 or the host CPU 811 may function as the controller.

The SATA device 830 includes a hard disk controller (HDC) 840, a memory 850, and a magnetic recording medium 860. The HDC 840 includes a main control unit (MCU) 841, a data bus 843, a second SATA interface 845, a buffer 847, and a disk controller 849. The MCU 841 controls the operation of at least one of the second SATA interface 845, the buffer 847, and the disk controller 849. The second SATA interface 845 includes a second optical modulator MOD(E/O) and a second optical demodulator DEM(O/E). The SATA device 830 may also include a controller configured to control the operation of the second SATA interface 845. The controller may be included within the second SATA interface 845 or the MCU 841 may function as the controller.

During a write operation, write data stored in the memory 815 is transmitted to the first optical modulator MOD(E/O) of the first SATA interface 819 under control of the DMA controller 817. The first optical modulator MOD(E/O) generates de-emphasis formatted optical write data from the write data and transmits the de-emphasis formatted optical write data to the second optical demodulator DEM(O/E) of the second SATA interface 845 via a data bus. The second optical demodulator DEM(O/E) demodulates the de-emphasis formatted optical write data to provide an electrical signal. The buffer 847 buffers the electrical signal and temporarily stores the buffered electrical signal in the memory 850. The disk controller 849 reads the electrical signal from the memory 850 and writes it to the magnetic recording medium 860 designated by a write address.

During a read operation, the disk controller 849 reads data from the magnetic recording medium 860 designated by a read address and stores the read data in the memory 850 through the buffer 847. The second optical modulator MOD(E/O) of the second SATA interface 845 generates de-emphasis formatted optical read data from the read data received from the memory 850 through the buffer 847, and transmits the de-emphasis formatted optical read data to the first optical demodulator DEM(O/E) of the first SATA interface 819 via a data bus. The first optical demodulator DEM(O/E) demodulates the de-emphasis formatted optical read data into an electrical signal. The DMA controller 817 stores the electrical signal from the first optical demodulator DEM(O/E) in the memory 815.

Figure 12:
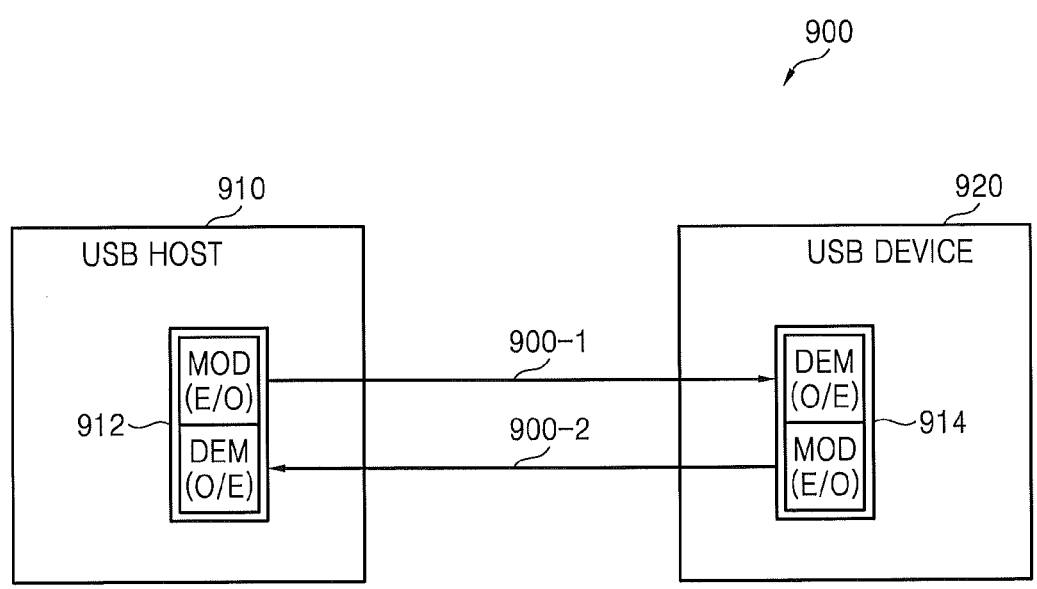
FIG. 12 is a block diagram illustrating a data processing system including optical modulators illustrated in FIGS. 1 through 5 in some embodiments according to the inventive concept.

FIG. 12 is a block diagram illustrating a data processing system 900 including optical modulators illustrated in FIGS. 1 through 5, in some embodiments according to inventive concept. The data processing system 900 transmits and receives serial data using a USB communication protocol and includes a USB host 910 and a USB device 920. In FIG. 12, MOD(E/O) denotes an optical modulator that may be implemented by one of the optical modulators 50, 70, 90, 110, and 30 respectively illustrated in FIGS. 1 through 5.

A de-emphasis formatted optical signal is generated by a first optical modulator MOD(E/O) in a first optical transceiver 912 in the USB host 910 and transmitted through a data bus 900-1 to a second optical demodulator DEM(O/E) in a second optical transceiver 914 in the USB device 920. The second optical demodulator DEM(O/E) of the USB device 920 demodulates the de-emphasis formatted optical signal to provide an electrical signal. The USB host 910 may also include a microcontroller (not shown) configured to control the operation of the first optical transceiver 912.

A de-emphasis formatted optical signal is generated by a second optical modulator MOD(E/O) in the second optical transceiver 914 in the USB device 920 and transmitted via a data bus 900-2 to a first optical demodulator DEM(O/E) in the first optical transceiver 912 of the USB host 910. The first optical demodulator DEM(O/E) of the USB host 910 demodulates the de-emphasis formatted optical signal to provide an electrical signal. The USB device 920 may also include a microcontroller (not shown) configured to control the operation of the second optical transceiver 914.

Figure 13:
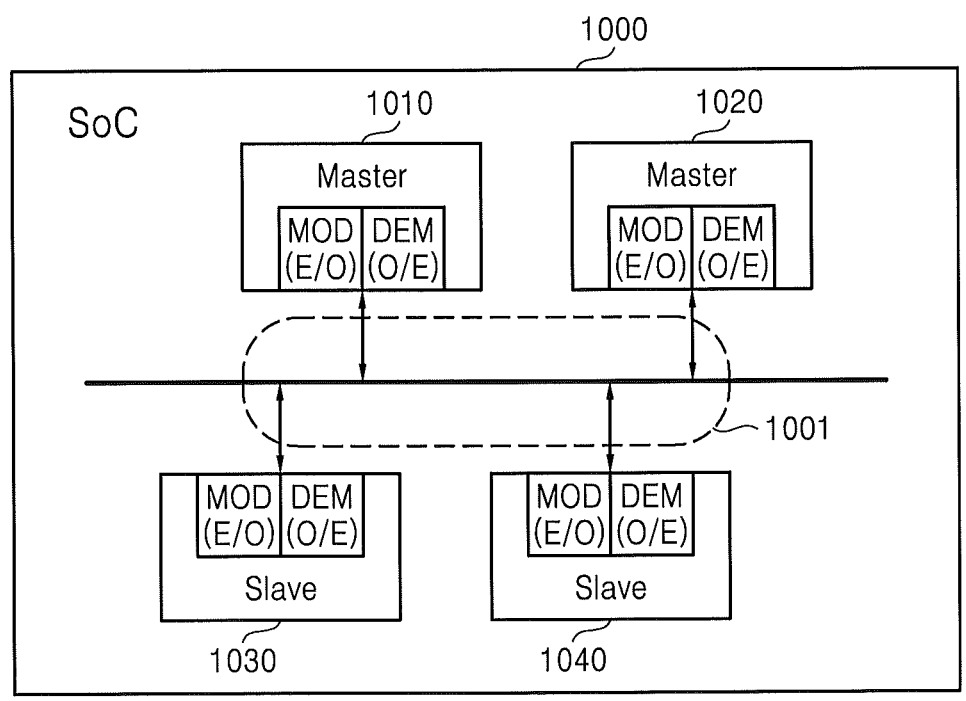
FIG. 13 is a block diagram illustrating a data processing system including optical modulators illustrated in FIGS. 1 through 5 in some embodiments according to the inventive concept.

FIG. 13 is a block diagram illustrating a data processing system 1000 including optical modulators illustrated in FIGS. 1 through 5 in some embodiments according to the inventive concept. The data processing system 1000 may be a system-on-chip (SoC) and includes a plurality of masters 1010 and 1020, a plurality of slaves 1030 and 1040, and a plurality of buses 1001. Each of the masters 1010 and 1020 and the slaves 1030 and 1040 includes an optical modulator MOD(E/O) and an optical demodulator DEM(O/E). Each of the buses 1001 may be implemented by an optical waveguide.

A de-emphasis formatted optical signal generated by each optical modulator MOD(E/O) is transmitted to one optical demodulator DEM(O/E) via a corresponding one of the buses 1001 implemented by optical waveguides. The optical demodulator DEM(O/E) demodulates the de-emphasis formatted optical signal to provide an electrical signal.

Figure 14:
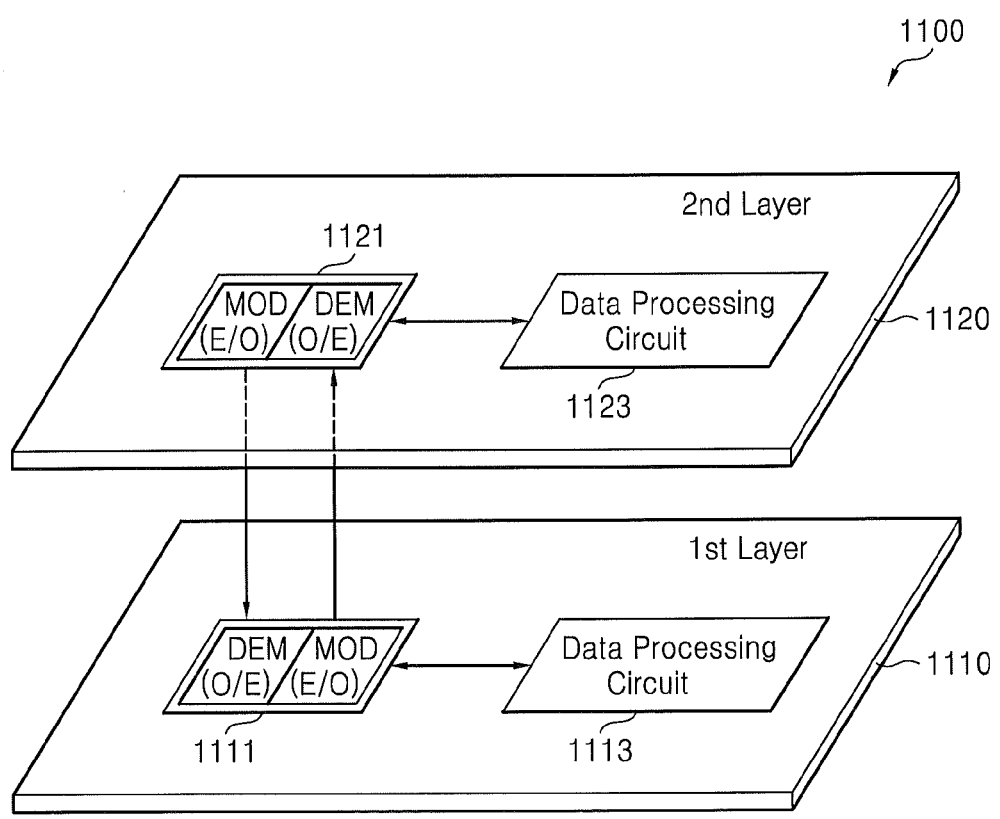
FIG. 14 is a block diagram illustrating a data processing system including optical modulators illustrated in FIGS. 1 through 5 in some embodiments according to the inventive concept.

FIG. 14 is a block diagram illustrating a data processing system 1100 including optical modulators illustrated in FIGS. 1 through 5 in some embodiments according to the inventive concept. The data processing system 1100 may have a stacked structure including a plurality of layers 1110 and 1120.

The first layer 1110 includes a first optical transceiver 1111 and a first data processing circuit 1113 configured to control the operation of the first optical transceiver 1111. A first optical modulator MOD(E/O) included in the first optical transceiver 1111 transmits a de-emphasis formatted optical signal to a second optical demodulator DEM(O/E) included in the second layer 1120 through an optical transmission element such as an optical waveguide, a through-silicon via (TSV), or optical fiber. The second optical demodulator DEM(O/E) demodulates the de-emphasis formatted optical signal to provide an electrical signal. The electrical signal is processed by a second data processing circuit 1123 included in the second layer 1120.

The second optical modulator MOD(E/O) included in a second optical transceiver 1121 included in the second layer 1120 transmits a de-emphasis formatted optical signal to a first optical demodulator DEM(O/E) included in the first layer 1110 through an optical transmission element such as an optical waveguide, a TSV, or optical fiber. The first optical demodulator DEM(O/E) demodulates the de-emphasis formatted optical signal to provide an electrical signal. The electrical signal is processed by the first data processing circuit 1113.

Figure 15:
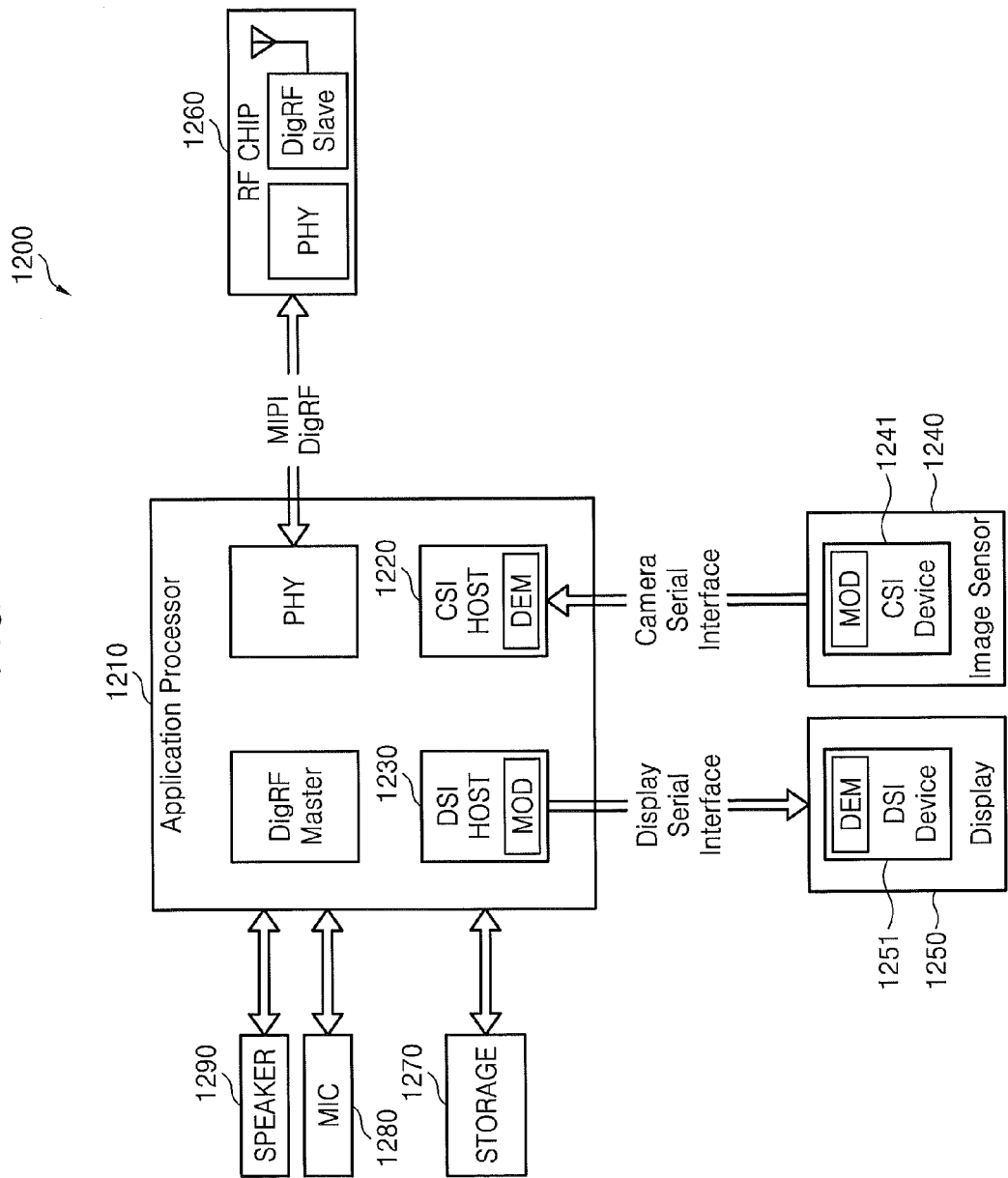
FIG. 15 is a block diagram illustrating a data processing system including optical modulators illustrated in FIGS. 1 through 5 in some embodiments according to the inventive concept.

FIG. 15 is a block diagram of a data processing system 1200 including one of the optical modulators illustrated in FIGS. 1 through 5 according to still other embodiments of the inventive concept. The data processing system 1200 may be implemented by an apparatus, such as a mobile phone, a smart phone, a personal digital assistant (PDA), a portable media player (PMP), or a mobile communication apparatus, that can use or support the MIPI®. The data processing system 1200 includes an application processor 1210, an image sensor 1240, and a display 1250.

A CSI host 1220 included in the application processor 1210 performs serial communication with a CSI device 1241 included in the image sensor 1240 through CSI. The CSI host 1220 includes an optical demodulator DEM. An optical modulator MOD included in the CSI device 1241 may be implemented by one of the optical modulators 50, 70, 90, 110, and 30 respectively illustrated in FIGS. 1 through 5.

A DSI host 1230 included in the application processor 1210 performs serial communication with a DSI device 1251 included in the display 1250 through DSI. An optical modulator MOD included in the DSI host 1230 may be implemented by one of the optical modulators 50, 70, 90, 110, and 30 respectively illustrated in FIGS. 1 through 5.

The data processing system 1200 may also include a radio frequency (RF) chip 1260, which communicates with the application processor 1210. A physical layer (PHY) of the application processor 1210 and a PHY of the RF chip 1260 communicate data with each other according to a MIPI DigRF standard. The data processing system 1200 may further include at least one element among a storage 1270, a microphone 1280, and a speaker 1290.

In the above-described embodiments, an electrical signal may be either a serial or a parallel electrical signal or either serial or parallel data.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A de-emphasis format signal generator configured to combine first and second electrical non-de-emphasis formatted signals provided to first and second optical modulators, coupled in parallel with one another, to provide a combined optical signal having a de-emphasis format,
   wherein an input data stream comprising a difference between two electrical signals, E1 and E2, is split for providing the first and second electrical non-de-emphasis formatted signals.

2. The de-emphasis format signal generator according to claim 1
   wherein the first electrical non-de-emphasis formatted signal is coupled to the first optical modulator to provide a first optical signal to a first waveguide;
   wherein the second electrical non-de-emphasis formatted signal is coupled to the second optical modulator that is longer than the first optical modulator to provide a second optical signal to a second waveguide that is shorter than the first waveguide; and
   an optical combiner, coupled to the first and second waveguides, and configured to combine the first and second optical signals to provide the combined optical signal having the de-emphasis format.

3. The de-emphasis format signal generator according to claim 2 wherein the first optical signal is delayed relative to the second optical signal via the second waveguide being shorter than the first waveguide and the first optical signal is attenuated relative to the second optical signal via a relative phase shift provided by the first optical modulator being shorter than the second optical modulator.

4. The de-emphasis format signal generator according to claim 1 further comprising:
   an electrical delay circuit configured to delay a first portion of the split input data stream to provide a delayed electrical signal;
   an electrical attenuator circuit, coupled to the electrical delay circuit, and configured to attenuate the delayed electrical signal to provide a delayed-attenuated electrical signal as the first electrical non-de-emphasis formatted signal to the first optical modulator to couple a first optical signal to a first waveguide, wherein a second portion of the split input data stream is provided to the second optical modulator as the second electrical non-de-emphasis formatted signal to provide a second optical signal to a second waveguide; and
   an optical combiner, coupled to the first and second waveguides, and configured to combine the first and second optical signals to provide the combined optical signal having the de-emphasis format.

5. The de-emphasis format signal generator according to claim 4 wherein the first optical signal is delayed relative to the second optical signal via the electrical delay circuit and the first optical signal is attenuated relative to the second optical signal via the electrical attenuator circuit.

6. The de-emphasis format signal generator according to claim 1 further comprising:
   an electrical attenuator circuit configured to attenuate a first portion of the split input data stream to provide an attenuated electrical signal as the first electrical non-de-emphasis formatted signal to the first optical modulator to couple a first optical signal to a first waveguide,
   wherein a second portion of the split input data stream is provided to the second optical modulator as the second electrical non-de-emphasis formatted signal to provide a second optical signal to a second waveguide that is shorter than the first waveguide; and
   an optical combiner, coupled to the first and second waveguides, and configured to combine the first and second optical signals to provide the combined optical signal having the de-emphasis format.

7. The de-emphasis format signal generator according to claim 6 wherein the first optical signal is delayed relative to the second optical signal via the first waveguide being longer than the second waveguide and the first optical signal is attenuated relative to the second optical signal via the electrical attenuator circuit.

8. The de-emphasis format signal generator according to claim 1 further comprising:
   an electrical delay circuit coupled to a first portion of the split input data stream and configured to provide a delayed electrical signal to the first optical modulator as the first electrical non-de-emphasis formatted signal to provide a first optical signal to a first waveguide;
   wherein a second portion of the split input data stream is coupled to the second optical modulator, that is longer than the first optical modulator, as the second electrical non-de-emphasis formatted signal to provide a second optical signal to a second waveguide; and
   an optical combiner, coupled to the first and second waveguides, and configured to combine the first and second optical signals to provide the combined optical signal having the de-emphasis format.

9. The de-emphasis format signal generator according to claim 8 wherein the first optical signal is delayed relative to the second optical signal via the electrical delay circuit and the first optical signal is attenuated relative to the second optical signal via a relative phase shift provided by the first optical modulator being shorter than the second optical modulator.

10. The de-emphasis format signal generator according to claim 8 wherein the first optical modulator includes opposing input terminals to which the delayed electrical signal is coupled; and
    wherein the second optical modulator includes opposing input terminals to which the second portion of the split input data stream is coupled.

11. The de-emphasis format signal generator according to claim 8 wherein the optical combiner couples the first and second waveguides at an output of the de-emphasis format signal generator, the de-emphasis format signal generator further comprising:
a continuous wave optical source coupled to a waveguide input of the first and second waveguides to provide respective optical inputs modulated by the first and second optical modulators responsive to the delayed electrical signal and the second portion of the split input data stream, respectively, to provide the first and second optical signals.

12. The de-emphasis format signal generator according to claim 1 wherein the de-emphasis format comprises a PCI-Express data transmission format.

13. The de-emphasis format signal generator according to claim 1 wherein the first and second optical modulators comprise different lengths.

14. The de-emphasis format signal generator according to claim 13 wherein the different lengths provide for an attenuation aspect of the combined optical signal using destructive interference of respective optical signals generated by first and second optical modulators.

15. The de-emphasis format signal generator according to claim 1 wherein the combined optical signal includes a de-emphasis attenuation aspect, a de-emphasis delay aspect, and a de-emphasis combined aspect, wherein the de-emphasis combined aspect and at least one of the de-emphasis attenuation aspect and the de-emphasis delay aspect are provided in an optical domain.

16. The de-emphasis format signal generator according to claim 15 wherein the de-emphasis delay aspect comprises a delay of about a 1 bit time interval.

17. A de-emphasis format signal generator comprising:
at least one of an optical attenuator and an optical delay unit; and
an optical combiner coupled to the at least one of the optical attenuator and the optical delay unit, to provide a de-emphasis formatted signal including a de-emphasis attenuation aspect, a de-emphasis delay aspect, and a de-emphasis combined aspect,
wherein an input data stream is split, a first portion of the split input data stream is delayed and attenuated to provide the de-emphasis attenuation aspect and de-emphasis delay aspect, and the delayed and attenuated first portion is combined with a second portion of the split input data stream to provide the de-emphasis combined aspect.

18. The de-emphasis format signal generator according to claim 17 wherein the de-emphasis delay aspect comprises a delay of about a 1 bit time interval.

19. A method of providing an optical signal comprising:
combining first and second non-de-emphasis formatted signals provided to first and second optical modulators, coupled in parallel with one another, to provide a combined optical signal having a de-emphasis format,
wherein an input data stream comprising a difference between two electrical signals, E1 and E2, is split for providing the first and second non-de-emphasis formatted signals.

20. A method of generating a de-emphasis formatted optical signal in an optical domain comprising generating a de-emphasis format for the optical signal including a de-emphasis attenuation aspect, a de-emphasis delay aspect, and a de-emphasis combined aspect, to the optical signal,
wherein an input data stream is split, a first portion of the split input data stream is delayed and attenuated to provide the de-emphasis attenuation aspect and de-emphasis delay aspect, and the delayed and attenuated first portion is combined with a second portion of the split input data stream to provide the de-emphasis combined aspect.

21. The method according to claim 20 wherein generating further comprises:
providing the de-emphasis delay aspect and the de-emphasis attenuation aspect in an electrical domain and providing the combined aspect in the optical domain.

22. The method according to claim 21 further comprising:
delaying and attenuating an electrical signal to provide the de-emphasis delay and de-emphasis attenuation aspects for an input to a first optical modulator generating a first optical signal;
providing the electrical signal to a second optical modulator, coupled in parallel with the first optical modulator, generating a second optical signal; and
combining the first and second optical signals provided to provide a combined optical signal via respective waveguides to provide the de-emphasis formatted optical signal.

23. The method according to claim 20 wherein generating further comprises:
providing the de-emphasis delay aspect, the de-emphasis attenuation aspect, and the de-emphasis combined aspect in the optical domain.

24. The method according to claim 20 wherein generating further comprises:
providing the de-emphasis attenuation aspect in an electrical domain and providing the de-emphasis delay aspect and the de-emphasis combined aspect in the optical domain.

25. The method according to claim 20 wherein generating further comprises:
providing the de-emphasis delay aspect in an electrical domain and providing the de-emphasis attenuation aspect and the de-emphasis combined aspect in the optical domain.

26. The method according to claim 20 wherein the de-emphasis format comprises a PCI-Express data transmission format.

27. The method according to claim 22 wherein the first and second optical modulators comprise different lengths.

28. The method according to claim 27 wherein the different lengths provide for the de-emphasis attenuation aspect of the combined optical signal using destructive interference of respective optical signals generated by first and second optical modulators.

29. The method according to claim 20 wherein the de-emphasis delay aspect comprises a delay of about a 1 bit time interval.

30. The de-emphasis format signal generator according to claim 1 wherein:
E1 is split into two electrical signals, E3 and E4;
E2 is split into two electrical signals, E5 and E6;
the first electrical non-de-emphasis formatted signal comprises a difference between E3 and E5; and
the second electrical non-de-emphasis formatted signal comprises a difference between E4 and E6.

31. The de-emphasis format signal generator according to claim 1 wherein the combined optical signal is a de-emphasis formatted representation of the input data stream.

32. The de-emphasis format signal generator according to claim 1 wherein a bit of the first electrical non-de-emphasis formatted signal is combined with a delayed and attenuated previous bit of the second electrical non-de-emphasis formatted signal to provide a bit of the combined optical signal with lower amplitude than the bit of the first electrical non-de-emphasis formatted signal.

\* \* \* \* \*